United States Patent [19]

Lemay et al.

[11] Patent Number: 4,837,738
[45] Date of Patent: Jun. 6, 1989

[54] ADDRESS BOUNDARY DETECTOR

[75] Inventors: Richard A. Lemay, Carlisle; William E. Woods, Natick; Steven A. Tague, Billerica, all of Mass.

[73] Assignees: Honeywell Information Systems Inc.; Hutton/PRC Technology Partners I, both of Minneapolis, Minn.

[21] Appl. No.: 927,631

[22] Filed: Nov. 5, 1986

[51] Int. Cl.$^4$ .................. G06F 12/00; G06F 12/06
[52] U.S. Cl. .................... 364/900; 364/969; 364/969.1
[58] Field of Search ... 364/200 MS File, 900 MS File

[56] References Cited

U.S. PATENT DOCUMENTS 3,768,080 10/1973 Boger et al. ............... 364/200
4,218,743 8/1980 Hoffman et al. ........... 364/200
4,224,667 9/1980 Lewis et al. ............... 364/200
4,340,932 7/1982 Bakula et al. .............. 364/200
4,545,016 10/1985 Berger ....................... 364/200

Primary Examiner—Eddie P. Chan
Assistant Examiner—Michael A. Jaffe
Attorney, Agent, or Firm—George Grayson; John S. Solakian; Lewis P. Elbinger

[57] ABSTRACT

An address boundary detector is disclosed that functions with an arithmetic logic unit (ALU) in a computer processor while the ALU generates addresses by adding an offset or displacement to a base address. The detector monitors bits of addresses to determine whether a data item can be completely stored within the same block or page of memory as that addressed by the base address from which it was derived.

2 Claims, 2 Drawing Sheets

FIG. 2

ADDRESS BOUNDARY DETECTOR

FIELD OF THE INVENTION

This invention relates to circuits for use in computers and more particularly to circuits for detecting if an address yielded by a computation in the computer is valid.

BACKGROUND OF THE INVENTION

In the prior art processors of different operational bit sizes (8, 16 or 32) are typically constructed of integrated circuits that have four input bits and four output bits. An example of such a four bit integrated circuit chip is the 2901 arithmetic chip which is used to implement an arithmetic logic unit in a processor. Also in a processor in a computer system, blocks of bytes as a page are assigned as required to store calculated results, and a multibyte calculation result may be stored between two blocks or pages. An invalid address occurs because a carry across a page-address boundary may cause data to reside in the subsequent block or page, but the carry may not be visible outside the ALU. This problem is particularly acute when addresses are being generated using inputs of a base address, an offset or displacement, and an operand length. Invalid or out-of-bound addresses may result with adverse effects.

Thus, there is a need in the art for an address boundary detector which can detect whether all bytes of a data item to be stored at a calculated address will fall within a block or page of memory.

SUMMARY OF THE INVENTION

The foregoing needs of the prior art are filled by the present invention. An address boundary detector is provided that can determine whether a multi-byte item can be completely stored within the same block or page of memory as that in which the base address resides.

The novel address boundary detector utilizes a commercially available Programmable Array Logic (PAL) integrated circuit chip that is programmed to analyze certain bits of a base address, certain offset or displacement bits, certain sum and carry bits, and the length of the data item whose address is being calculated, and generate a carry-out which the ALU cannot visibly generate. This carry-out indicates an out-of-bounds address caused when all bytes of the multibyte data item cannot be stored in the same block or page of a memory as that pointed to by the base address from which it is derived.

DESCRIPTION OF THE DRAWING

FIG. 2 is a truth table showing the programming of a programmable arithmetic logic (PAL) array used to implement the address boundary detector in accordance with the teaching of the preferred embodiment of the invention.

DETAILED DESCRIPTION

Figure 1:
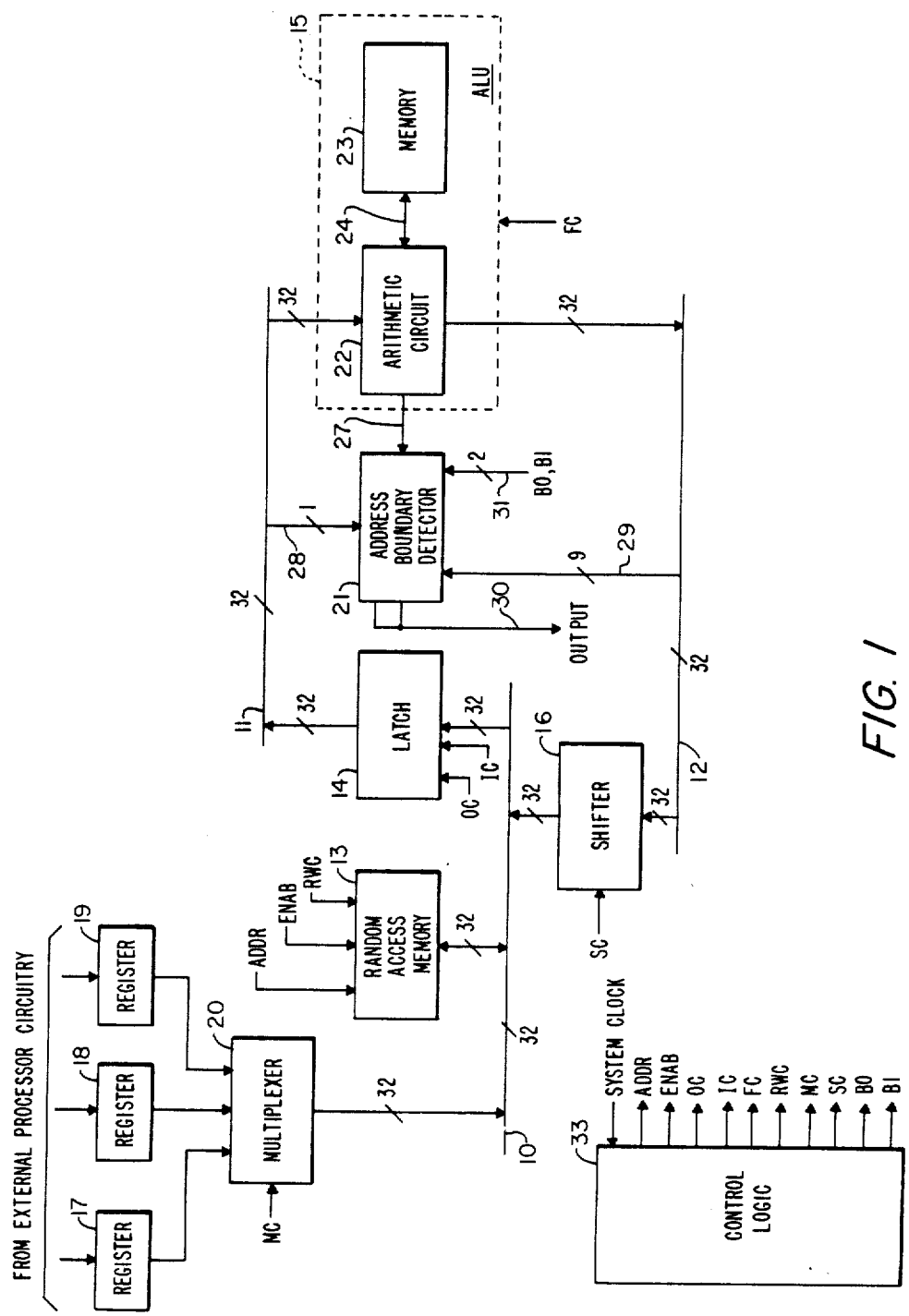
FIG. 1 is a circuit block diagram of a processor system utilizing the subject invention.

In FIG. 1 is seen a block diagram of a portion of a computer system having an arithmetic logic unit (ALU) 15 with which the novel address boundary detector 21 functions in accordance with the teaching of the present invention. In the description hereinafter of the operation of address boundary detector 21, ALU 15 is used to calculate addresses and a base address, displacement or offset, and operand size are initially read out of memory 13. The portion of the computer system shown in FIG. 1 utilizes a time partitioned bus arrangement having three simple busses 10, 11 and 12, each having thirty-two parallel paths to handle thirty-two bit binary words. A number of circuits are connected to or between busses 10, 11 and 12. They are random access memory (RAM) 13, latch 14, arithmetic logic unit (ALU) 15, shifter 16, and multiplexer (MUX) 20. Multiplexer 20 is used to connect individual ones of registers 17, 18 and 19 to bus 10. These circuits are controlled by a control logic circuit 33 in a manner well known in the art.

RAM 13 has a number of addressable locations in which are stored addresses or data in a manner well known in the art. The source of information stored in RAM 13 is from external processor circuitry (not shown) and is transferred to the RAM via registers 17, 18 and/or 19, multiplexer 20 and bus 10. RAM 13 has a single thirty-two lead input/output via which thirty-two bit data words are stored in or read out therefrom. The RAM has an addressing control input ADDR to indicate a location therein to be addressed, and also has a control lead ENAB that enables RAM 13 to be used. Furthermore, RAM 13 has a read/write control lead RWC which is used to indicate whether RAM 13 is to be written into or read from. Control logic 33 controls these operations in a manner well known in the art.

Latch 14 has a thirty-two bit input connected to bus 10 and a thirty-two bit output connected to bus 11. This latch is used to pass binary information from bus 10 to bus 11. An input control lead IC controls opening the input of latch 14 to store information present on bus 10, such as the base address or displacement to be transferred to ALU 15. There is also an output control lead OC which controls opening the output of latch 14 to place information stored therein onto bus 11. Latch 14 and its operation are well known in the art.

ALU 15 has an arithmetic circuit 22 and an internal memory 23. ALU has a thirty-two bit input connected to bus 11 and a thirty-two bit output connected to bus 12. To implement the present invention ALU 15 also has an output lead 27 the signal on which is described in greater detail further in this specification. ALU 15 can perform a variety of arithmetic functions on data input thereto as determined by control signals FC in a manner well known in the art. In the function described hereinafter ALU 15 uses a base address and an offset or displacement and is used to generate an address that is checked by the novel address boundary detector 21.

Shifter 16 has a thirty-two bit input connected to bus 12 and a thirty-two bit output connected to bus 10. Shifter 16 is also well known in the art and can be used to perform functions such as transposing bits of binary words passing through the shifter. Shifter 16 acts under control of a signal on its control input SC from control logic circuit 33 to act as a buffer between busses 12 and 10 and passes binary words input thereto through to bus 10.

Thirty-two bit registers 17, 18 and 19 are well known in the art. They are individually connected to bus 10 via a multiplexer 20 which is under control of control logic circuit 33 via control lead MC to connect ones of the registers to bus 10.

Control logic circuit 33 controls the operations of the above identified circuits in a manner well known in the art but only its control of a few of the circuits is described in detail as are pertinent to understanding the operation of the present invention. This control is accomplished via control signals ADDR, ENAB, RWC, IC, OC, FC, MC and SC which go to the circuits having control leads of the same designation. The leads from control logic circuit 33 to the different circuits are not shown to avoid cluttering up the drawing.

Address boundary detector 21 utilizes a programmable array logic (PAL) circuit which is a commercially available 16L8B PAL. Detector 21 is connected to arithmetic circuit 22 of ALU 15 via lead 27 to obtain a bit of information (C24) that it needs to perform its function. Bit C24 on lead 27 and the function of detector 21 are described in greater detail further in this specification. Other inputs and outputs to boundary address detector PAL 21 on leads 28 through 31 are shown in Table 1 below. The purpose of the inputs and outputs on these leads is also described in greater detail further in this specification. The programming of PAL 21 is shown in the truth table in FIG. 2 and is described further in this specification.

TABLE 1

| PAL 21 Inputs and Outputs | |
|---|---|
| Pin 1 | Carry bit 24 on lead 27 |
| Pin 2 | Bit 23 from bus 11 on lead 28 |
| Pin 3 | Bit 23 from bus 12 on lead 29 |
| Pin 4 | Bit 24 from bus 12 on lead 29 |
| Pin 5 | Bit 25 from bus 12 on lead 29 |
| Pin 6 | Bit 26 from bus 12 on lead 29 |
| Pin 7 | Bit 27 from bus 12 on lead 29 |
| Pin 8 | Bit 28 from bus 12 on lead 29 |
| Pin 9 | Bit 29 from bus 12 on lead 29 |
| Pin 11 | Bit 30 from bus 12 on lead 29 |
| Pin 15 | Bit 31 from bus 12 on lead 29 |
| Pins 13 & 14 | Data length indication B0 & B1 on lead 31 |
| Pins 18 & 19 | Generated carry on lead 30 |

Figure 2:
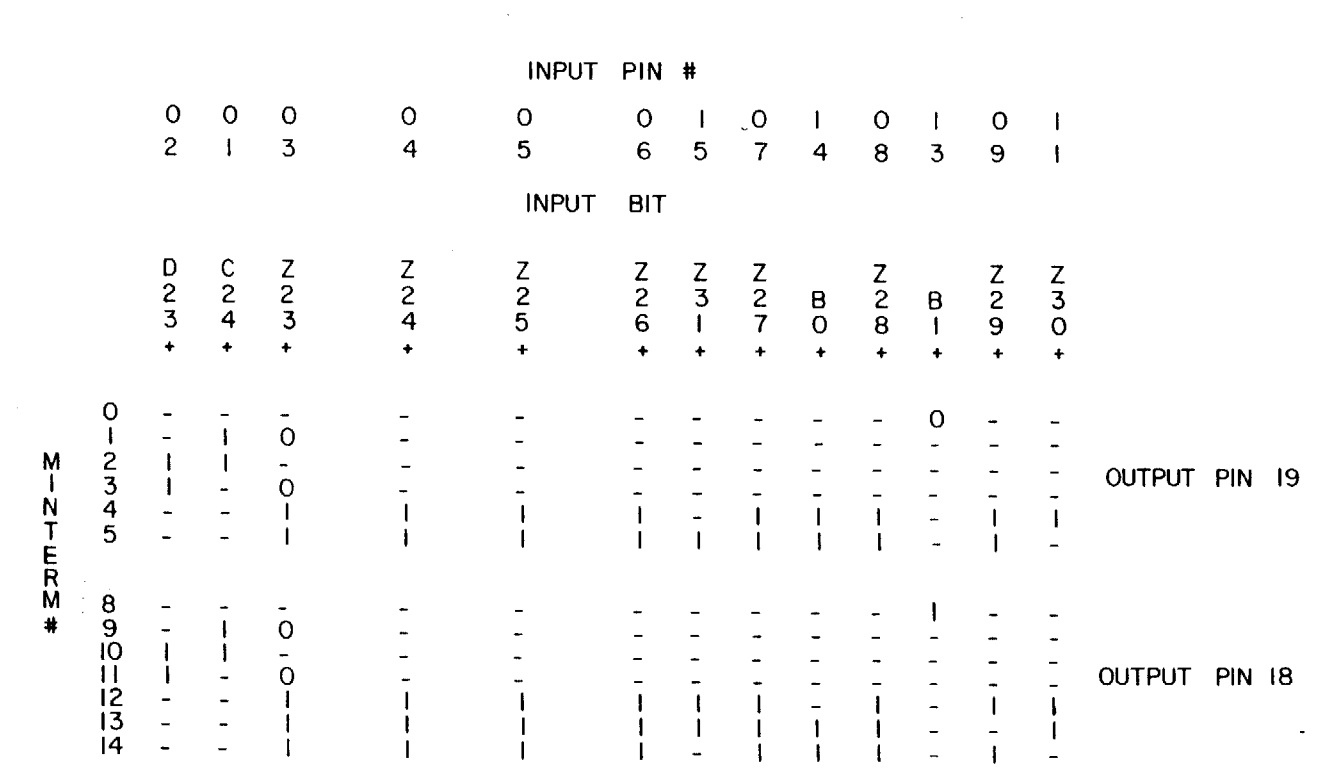

In FIG. 2 is shown a truth table for the programming of address boundary detector PAL 21. As mentioned at the beginning of this detailed description, PAL 21 is a commercially available 16L8B programmable array logic (PAL) circuit. The pin numbers at the top and on the right side of FIG. 2 are respectively the input and output pin numbers for this particular PAL. The input pin numbers at the top of FIG. 2 have the particular input data bit designations adjacent them. In the truth table of FIG. 2 are shown the one or zero values of certain bits of the base address, resultant or new address, and bits generated inside ALU 15 during address generation that are used by address boundary detector 21 to look for carrys generated inside ALU 15 and to determine whether a low order byte of a multibyte item will be stored in a different page of memory than the highest order byte and/or the base address. One values are shown as 1, zero values are shown as 0, and values that can be either a zero or a one are shown as a dash.

The minterm numbers of PAL 21 are correlated with the input and output pin numbers in the truth table in FIG. 2 so that one skilled in the art can understand how PAL 21 is programmed to be responsive to specific bits of the addressing signals on busses 11 and 12, and to a carry bit generated in arithmetic circuit 22 to determine when a byte of a data item will be in a different page in memory.

There is a two bit input to address boundary detector 21 on leads 31 from other computer circuitry (not shown) that indicates the length of the operands. The provision of this operand length is mentioned hereinabove and is well known in the art. Accordingly, its source and generation are not shown or described. The information which these two bits contain sets a threshold on how close to a page boundary newly generated addresses can come before there is a carry problem, with bytes of the data being in two different pages. The two inputs are designated B0 and B1 and are input to pins 14 and 13 of PAL 21 as indicated in Table 1. The binary values of the signal on leads B0 and B1 and the data byte lengths that they indicate are shown immediately herebelow in Table 2. With reference to FIG. 2, when B1=0 minterms 1 through 5 are enabled and minterms 9 through 14 are disabled, and when B1=1 minterms 9 through 14 are enabled and minterms 1 through 5 are disabled. The output from the minterms is also dependent upon the state of the signal on lead B0. When address length bit B0=1 in addition, minterms 4, 5, 13 and 14 are false. The other minterms are not dependent upon the zero or one value on lead B0.

TABLE 2

| B0 | B1 | Address length |
|---|---|---|
| 0 | 0 | 1 byte |
| 0 | 1 | 2 bytes |
| 1 | 0 | 4 bytes |
| 1 | 1 | 6 bytes |

In operation, address boundary detector 21 needs the least significant nine bits Z23–Z31 of the address output by ALU 15 onto bus 12 and they are input in parallel to address boundary detector 21 on leads 29. Circuit 21 also needs the twenty-third bit (D23) of the base address currently being input to ALU 15 to have a displacement value stored in memory 23 added thereto to create the resultant address output onto bus 12. The only other input to circuit 21 is from arithmetic circuit 22 in ALU 15 and is on lead 27. This input from ALU 15 indicates a carry output from the eighth least significant digit C24 of the result calculated within ALU 15.

In a simple example of the operation of the present invention, the data length values are B0=0 and B1=0, indicating that the datum is one byte long. For any one byte case the base address added to the offset or displacement must not produce a carry, in order for the resultant address to be stored in the same page or block of memory as the base address from which it is derived. Thus, for the one byte case detector 21 is to determine whether or not there is a carry out of the twenty-third bit of the sum output from arithmetic circuit 22. If there is a carry output it indicates that the generated address will not be in the same page or block of memory as the base address. To make this determination, address boundary indicator 21 has input thereto bits D23 from bus 11, Z23 from bus 12, and C24 from ALU 15 as mentioned hereinabove. With these known values the unknown values C23 and R23 may be derived. To understand how PAL 21 derives these unknown values, we look at the truth table in Table 3 immediately below.

TABLE 3

| Inputs To Adder Stage | | | Outputs Of Adder Stage | |
|---|---|---|---|---|
| R23 | D23 | C24 | Z23 | C23 |
| 0 | 0 | 0 | 0 | 0 |
| 0 | 0 | 1 | 1 | 0 |
| 0 | 1 | 0 | 1 | 0 |
| 1 | 0 | 0 | 1 | 0 |
| 0 | 1 | 1 | 0 | 1 |
| 1 | 0 | 1 | 0 | 1 |

TABLE 3-continued

| Inputs To Adder Stage | | | Outputs Of Adder Stage | |
| --- | --- | --- | --- | --- |
| R23 | D23 | C24 | Z23 | C23 |
| 1 | 1 | 0 | 0 | 1 |
| 1 | 1 | 1 | 1 | 1 |

In Table 3 C24, D23 and Z23 are inputs to PAL 21. C23 is the output from PAL 21 for the one byte case. Table 3 is a truth table showing all the combinational values of the known bit values Z23, D23 and C24; and also the resultant values for the unknown bit values R23 and C23. With the known bit values input to detector 21 the unknown values are then determined. It is this truth table information in Table 3 which is programmed into PAL 21 for one byte data. This is a simple case using address boundary indicator 21. With data sizes other than one byte long, each carry must be anticipated that would have resulted if addition of a constant beyond addition of the offset is done. That is, for data sizes greater than one byte, PAL 21 is trying to compute the address for storage of the right or lowest order byte of an item and verify that it is in the same page or block as the left hand byte(s) of the same item and of the base address.

No matter how many bytes an item has; one, two, four or six, if there is a carry-out from the twenty-third bit of the sum output from arithmetic circuit 22 onto bus 12 it indicates that the entire item is outside of the page or block in which is stored the base address. This results in an illegal address. In the truth table shown in FIG. 2 for PAL 21, minterms 1 and 9, 2 and 10, and 3 and 11 are byte size independent and are used to indicate an illegal address condition where there is a carry from bit 23 (C23) and a byte of an item is in a page other than the base address.

This leaves five minterms 4, 5, 12, 13 and 14 that are sentitive to the byte size of the address. Minterms 4 and 5 function for four byte items, minterm 12 functions for two and six byte items, and minterms 13 and 14 function for six byte items.

Thus, referring to FIG. 2, for two byte items minterm 12 looks at the lower order nine bits (Z23–Z31) of a new address for . . . 1 1111 1111, at bit D23 of the base address on bus 11 being either a zero or one, at carry bit C24 generated inside ALU 15 being either a zero or a one, and at data length bit B1 being one that indicates two or six byte items. For four byte items minterms 4 and 5 are used. Minterm 4 of PAL 21 is looking at the lower order nine bits (Z23–Z31) of a new address to be . . . 1 1111 111X (where X can be either a zero or a one), at bit D23 of the base address on bus 11 being either a zero or one, at carry bit C24 generated inside ALU 15 being either a zero or a one, and at size bit B0=1and B1 being zero indicating a four byte item. Also for the four byte case, minterm 5 is looking at the lower order nine bits (Z23–Z31) of a new address to be . . . 1 1111 11X1 (where X can be either a zero or a one), at bit D23 of the base address on bus 11 being either a zero or one, at carry bit C24 generated inside ALU 15 being either a zero or a one, and at size bit B0=1 and B1 being zero. For the six byte case minterm 12 described at the beginning of this paragraph is used, and also minterms 13 and 14 are used. Minterm 13 of PAL 15 is looking at the lower order nine bits (Z23–Z31) of a new address to be . . . 1 1111 1X11 (where X can be either a zero or a one), at bit D23 of the base address on bus 11 being either a zero or one, at carry bit C24 generated inside ALU 15 being either a zero or a one, and at size bits B0 and B1 being ones. Minterm 14 of PAL 15 is looking at the lower order nine bits (Z23–Z31) of a new address to be . . . 1 1111 11XX (where X can be either a zero or a one), at bit D23 of the base address on bus 11 being either a zero or one, at carry bit C24 generated inside ALU 15 being either a zero or a one, and at size bits B0 and B1 being ones.

While what has been described hereinabove is the preferred embodiment of the invention, it would be obvious to those skilled in the art that many changes may be made without departing from the spirit and scope of the invention.

What is claimed is:

1. A data processing system including means for detecting memory address page crossing, said system comprising, a memory for storing data in storage space divided into pages of $2^n$ storage locations per page, each of said locations being specified by a multi-bit binary address such that the least significant n bits of said address identify one of said locations within a particular page and the remaining bits of said address identify the particular page containing said one location, an integrated circuit arithmetic unit for performing the addition of a base addend address to an offset addend address to form a result address, said arithmetic unit including means for adding the nth bit of the base addend address, the nth bit of the offset addend address, and the low-order carry bit resulting from the addition of the —-1 lower order bits of the two addend addresses to generate a result bit and a boundary crossing carry bit, said boundary crossing carry bit being inaccessible to circuitry exterior to said integrated circuit arithmetic unit, and a sensing mechanism external to said integrated circuit for generating a replica of said boundary crossing carry bit to identify result addresses which specify a memory location in a page different than the page occupied by the location specified by said base addend address, said sensing mechanism comprising, in combination, a first input connected to receive said low-order carry bit, a second input connected to receive the nth bit of one of said addend addresses, a third input connected to receive said result bit, and first logic means responsive to the bit values received on said first, second and third inputs for generating said replica of said boundary crossing carry bit, said replica being a binary 1 whenever a binary 0 is received at said third input and a binary 1 is received at either said first or said second input, or a binary 1 is received at both said first and second inputs.

2. A sensing mechanism as set forth in claim 1 further comprising size checking means for detecting when a data unit having a predetermined length when stored in said memory at locations beginning with the location specified by said result address will extend into a different one of said pages, said size checking means comprising, in combination, a source of a size value indicating said known length, and second logic means jointly responsive to said size value and the least significant n bits of said result address for determining if the last location to be occupied by said data unit resides in a page different from the location designated by said base address.

* * * * *